Aug. 19, 1930.  G. T. TRUNDLE, JR  1,773,382
MACHINE FOR MAKING ANNULAR LAMINATED BODIES
Filed May 23, 1925  6 Sheets-Sheet 4
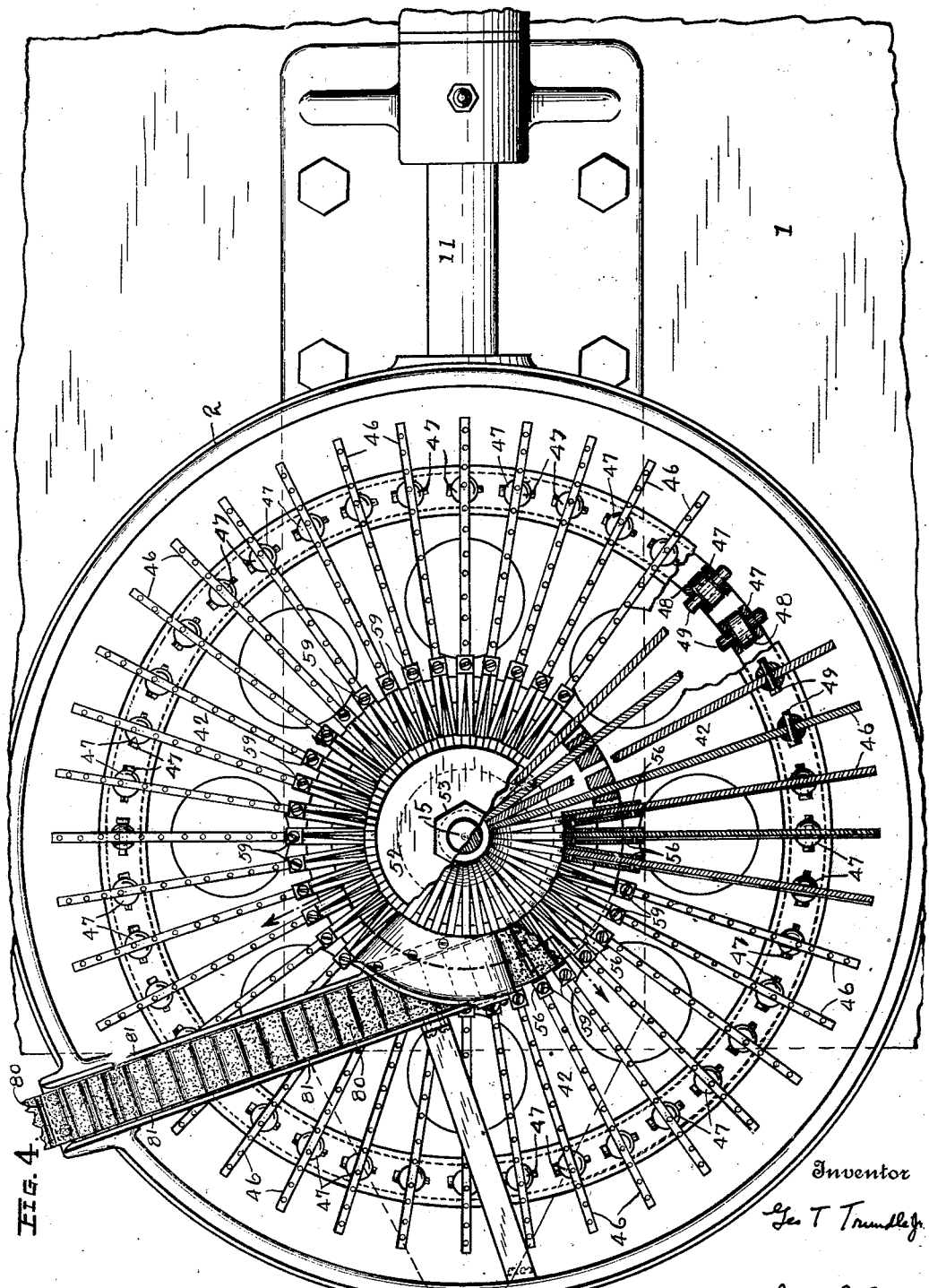

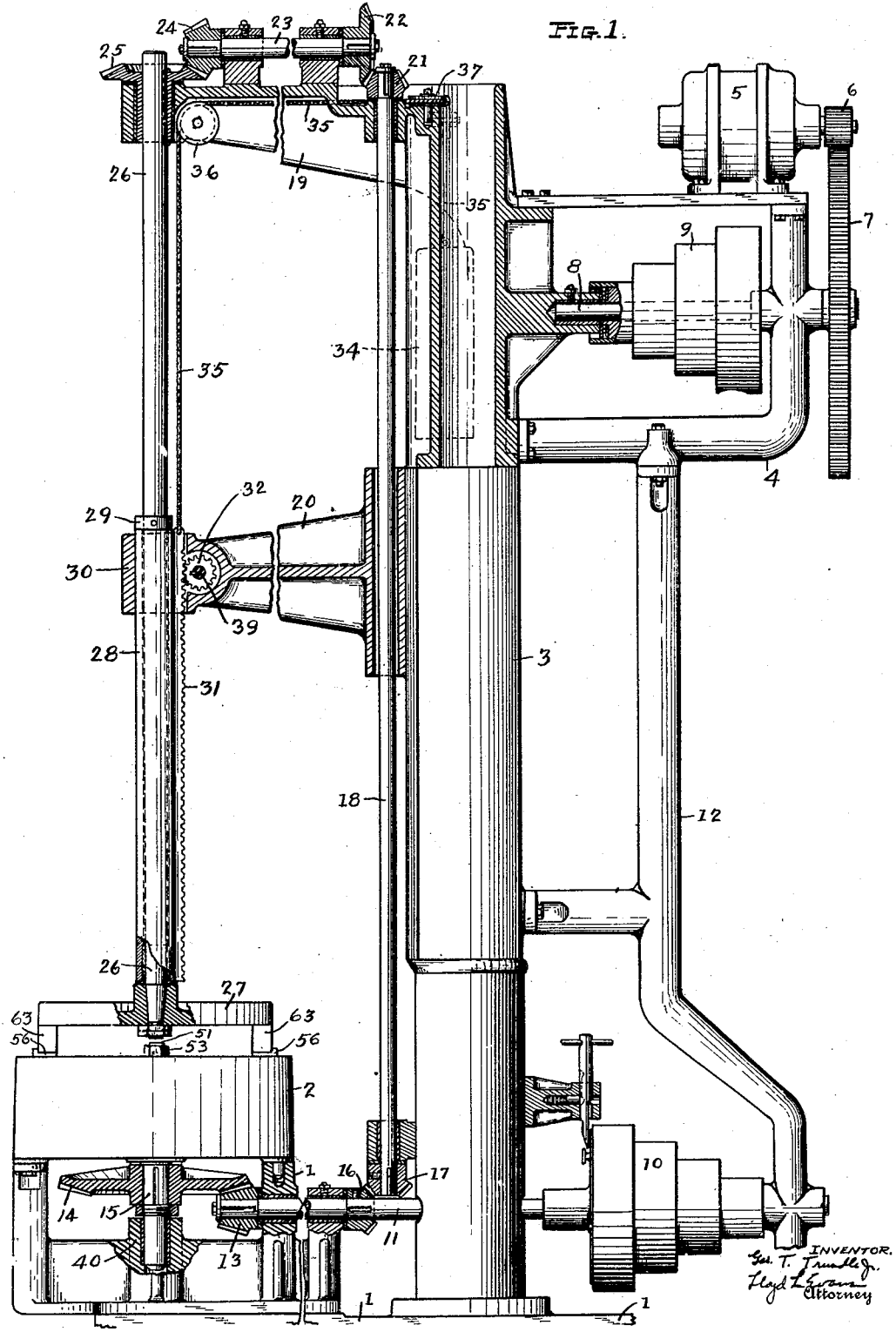

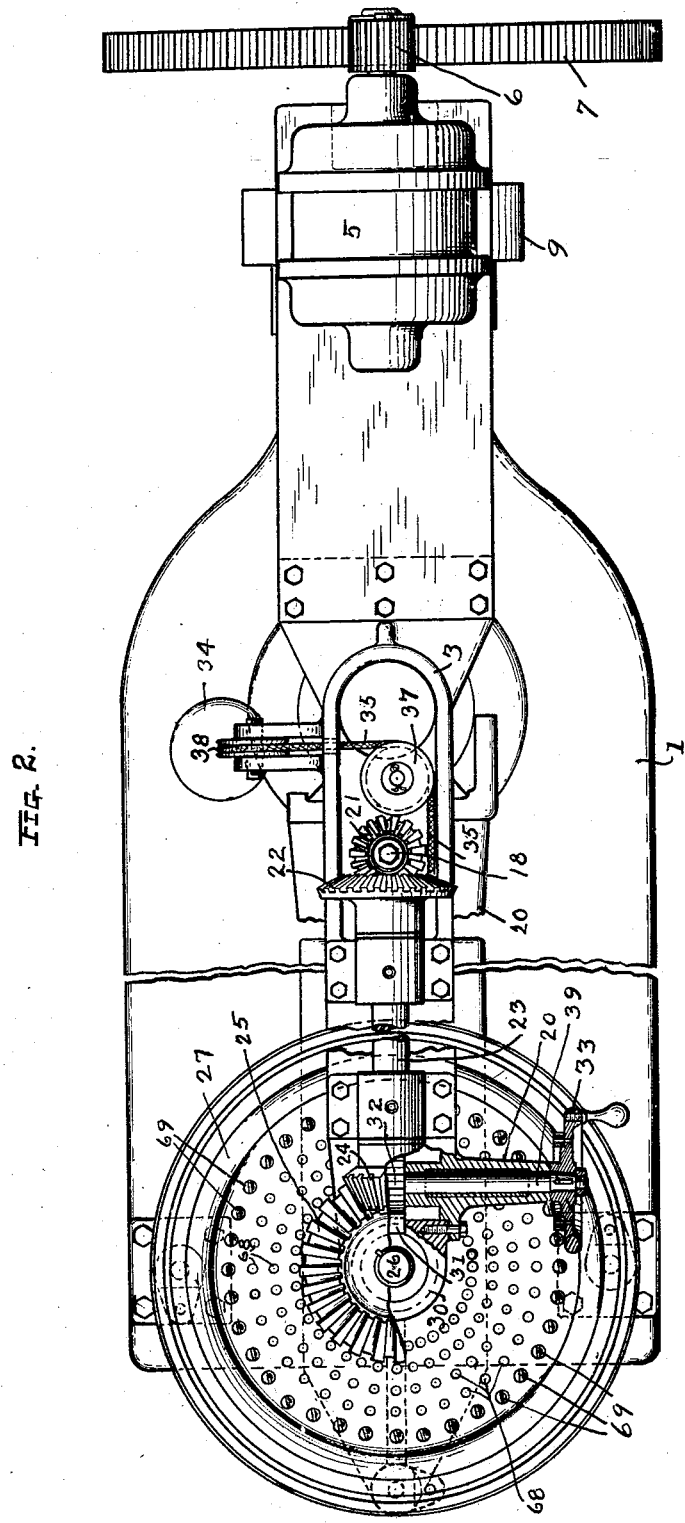

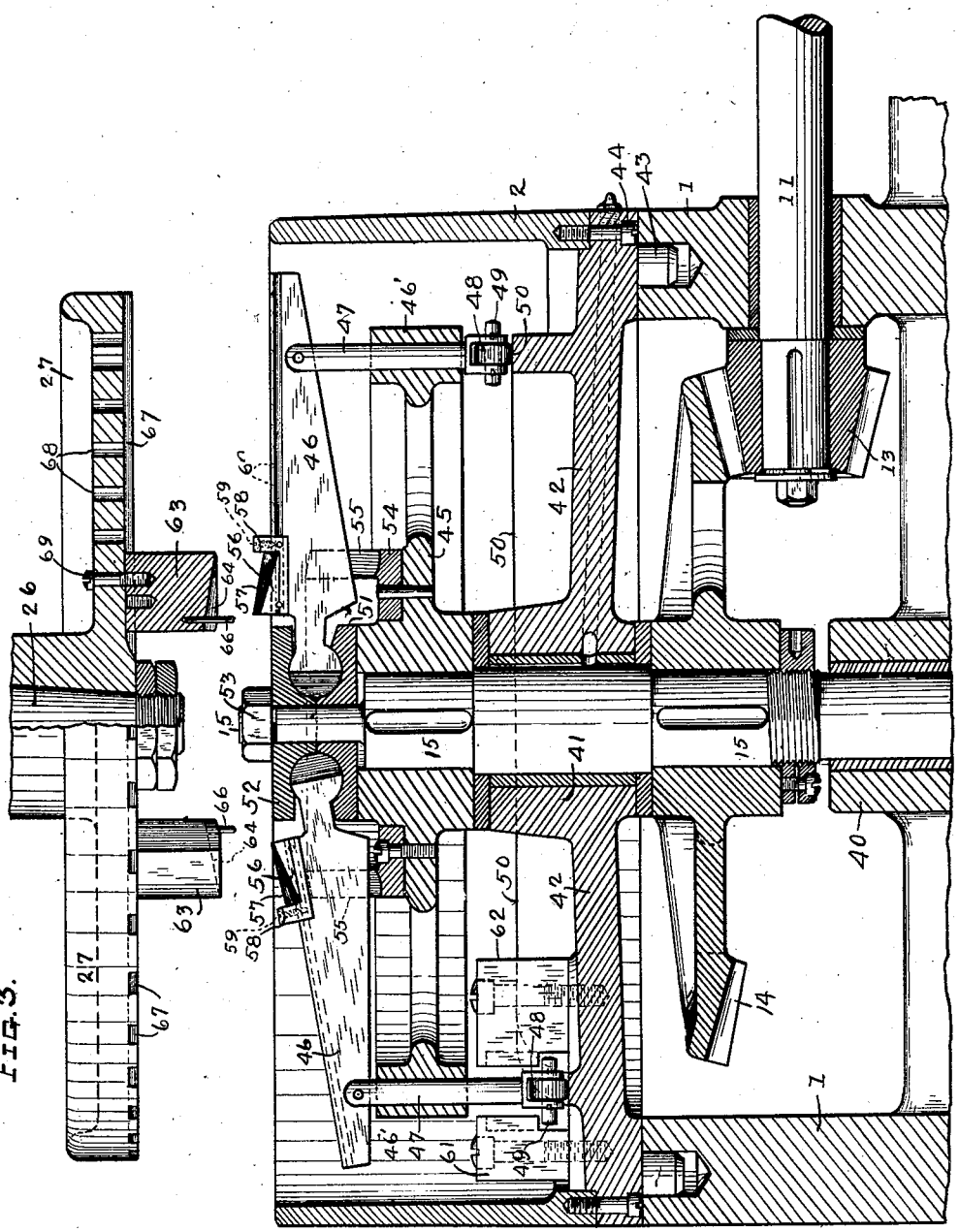

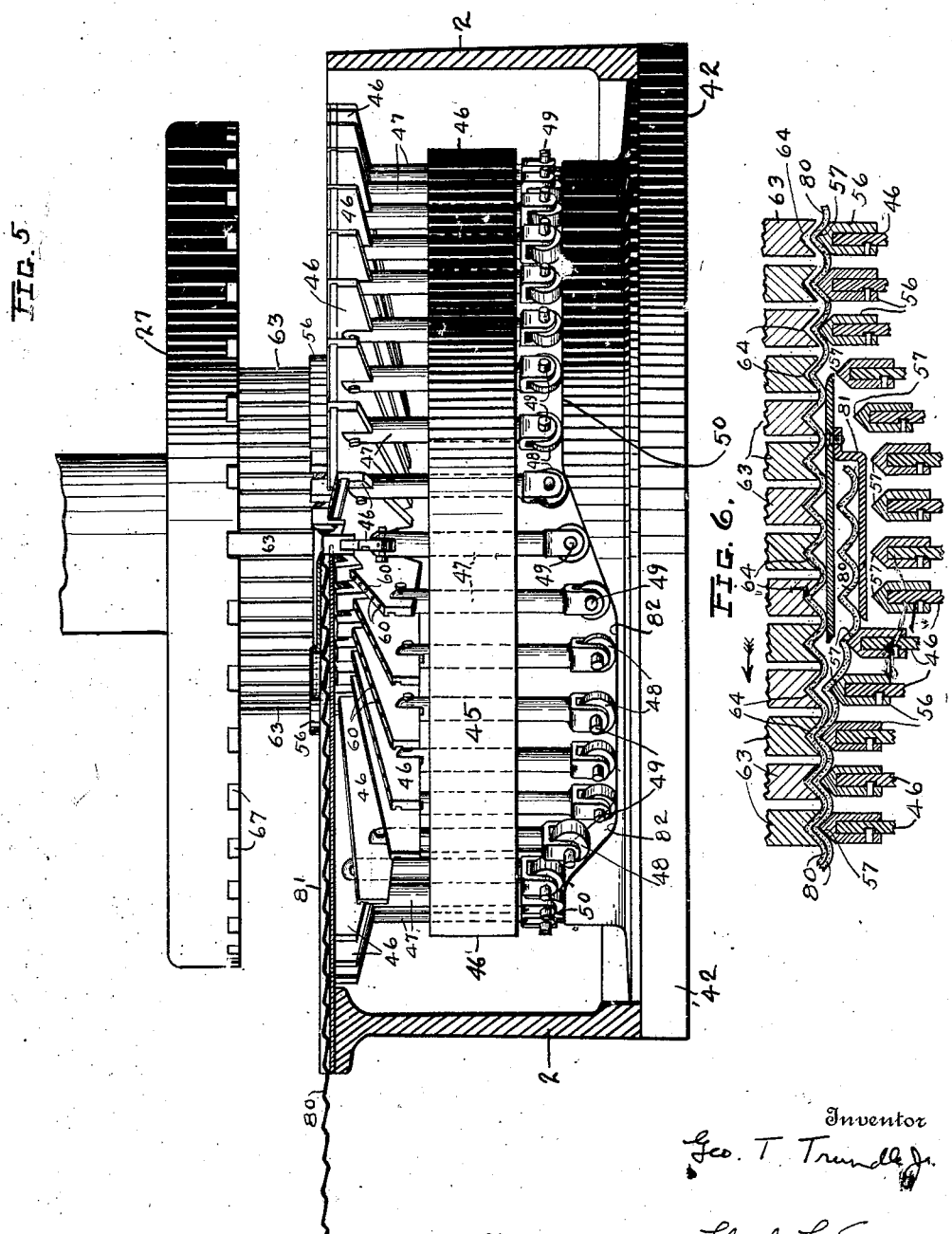

Aug. 19, 1930. G. T. TRUNDLE, JR 1,773,382
MACHINE FOR MAKING ANNULAR LAMINATED BODIES
Filed May 23, 1925  6 Sheets-Sheet 6
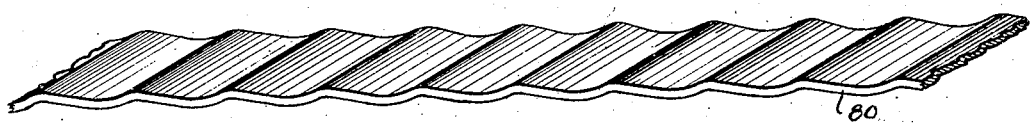
Fig. 7.
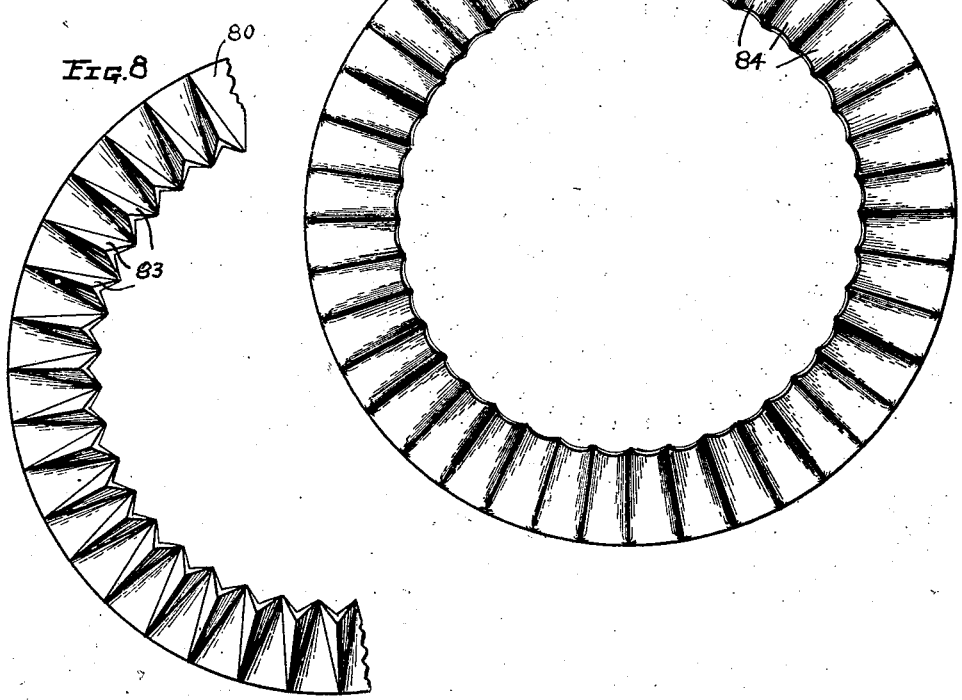
Fig. 9.

Patented Aug. 19, 1930

1,773,382

UNITED STATES PATENT OFFICE

GEORGE T. TRUNDLE, JR., OF CLEVELAND HEIGHTS, OHIO, ASSIGNOR, BY MESNE ASSIGNMENTS, TO WILLIAM T. HENSLEY, OF INDIANAPOLIS, INDIANA

MACHINE FOR MAKING ANNULAR LAMINATED BODIES

Application filed May 23, 1925. Serial No. 32,398.

This invention relates to a machine for making laminated annular bodies.

One of the objects of my invention is to provide a machine for winding a strip of material into superposed layers and forming an annular body and positively forming corrugations increasing in width radially outwardly, and to simultaneously press the corrugations thus formed into nested relation with previously wound turns of said body.

One of the objects of my invention is to provide a machine for winding a strip of frangible material, such as strawboard, wood pulp paper, and other materials of this general nature, into an arcuate form by enlarging the corrugations formed in the strip along the inner side of the strip, thus forming corrugations decreasing in width radially outwardly.

Another object of my invention is to provide a machine for enlarging the corrugations radially inwardly and puckering the strip while bending it into arcuate form, and also for pressing the arcuate strip into nested relation with previously wound portions thereof to form an annular body.

An additional object of my invention is to provide an improved machine for winding annular bodies which will concurrently wind and nest said bodies progressively as the winding operation proceeds.

An additional object of my invention is to provide a machine having a plurality of separately actuated compressing levers that operate to superimpose the layers of fibrous material in nested relation into an annular body.

A further object of my invention is to provide means for puckering one edge of the strip of material being wound into an annulus and to maintain the puckered portions of successive strips in nested relation.

With the above and other objects in view, the invention may be said to comprise the apparatus illustrated in the accompanying drawings, hereinafter described and particularly set forth in the appended claims, together with such variations and modifications thereof as will be apparent to one skilled in the art to which the invention appertains.

Reference should be had to the accompanying drawings forming a part of this specification, in which Figure 1 is a side elevational view, shown partially in section with parts broken away, of a machine embodying this invention.

Fig. 2 is a top plan view of the machine shown in Fig. 1.

Fig. 3 is an axial sectional view taken through the strip winding mechanism.

Fig. 4 is a top plan view of the base portion of the machine, portions being broken away and shown in section.

Fig. 5 shows the fixed casing in section and the strip winding mechanism in side elevation.

Fig. 6 is a vertical section through the winding members and strip guide taken substantially on dot and dash arrow line of Fig. 4 at the point where the strip is fed between the rotary grippers.

Fig. 7 is a fragmentary view of a corrugated strip ready to be wound.

Fig. 8 is a fragmentary view of a portion of a strip that has been wound into an annulus and showing the V-shaped ridges formed in the strip.

Fig. 8ª is a fragmentary view of a strip removed from the machine after one turn has been made, with the puckered portion of the strip more rounding than those in Fig. 8.

Fig. 9 is a side elevation, partly in section, of a completed annulus after it has been compressed.

In accordance with the present invention, annular laminated bodies are formed from long narrow strips of fibrous material which are preferably first corrugated transversely and then fed between an annular series of rotating gripping elements which engage the strip and enlarge the corrugations at the inner side of the strip as it is bent edgewise into arcuate form. The gripping elements then wind the strip in successive layers while holding it at right angles to the axis of rotation so that the annular bodies thus formed, when subsequently compressed with a relatively great pressure, have substantially flat annular laminæ. The gripping members are formed to engage in the corrugations of the strip and to exert sufficient pressure upon the material held between them in order to progressively push the layers coated with binding material into contact with previously wound layers.

Referring to the accompanying drawings, the apparatus is mounted upon a suitable base 1 upon which is mounted a fixed casing 2 enclosing the strip winding devices and to pedestal 3 alongside the casing which serves to support the driving mechanism. The pedestal 3 carries a bracket 4 adjacent its upper end upon which is mounted an electric motor 5 having a pinion 6 which meshes with a large gear 7 fixed to a jack shaft 8 which is journaled in the pedestal 3 and bracket 4 immediately beneath the motor. Fixed on the shaft 8 is a differential pulley 9 adapted to receive a suitable belt (not shown) which is adapted to extend over a second differential pulley 10 on a horizontal shaft 11 journaled in the pedestal and in a supporting bracket 12 which is secured to the pedestal and to the bracket 4. The shaft 11 extends through the pedestal and through the wall of the casing 2 and has a bevel pinion 13 mounted upon the end thereof and adapted to drive the winding mechanism enclosed within the casing 2 through a bevel gear 14 which is keyed to the vertical shaft 15, upon the upper end of which is mounted the gripping elements which are adapted to engage the under side of the strip of material which the machine is adapted to wind.

Between the pedestal 3 and casing 2, shaft 11 has a second bevel gear 16 keyed thereto which meshes with a bevel gear 17 which is mounted on the lower end of a vertical shaft 18 which is journaled at its lower end in a suitable bearing member which is carried by the pedestal and in a supporting arm 19 which extends laterally from the top of the pedestal. The shaft 18 also extends through an intermediate supporting arm 20 which is carried by the pedestal. The shaft 18 has a bevel gear 21 mounted on its upper end and adapted to mesh with a bevel gear 22 which is carried by one end of a horizontal shaft 23 which is suitably journaled in vertically extending portions of the arm 19. The outer end of the shaft 23 has a bevel gear 24 mounted thereon and adapted to mesh with a bevel gear 25 which is journaled in the extremity of the arm 19. A vertical shaft 26 is driven from the gear 25 in which it is slidably keyed to permit relative longitudinal movement of the shaft 26 through the gear 25. The lower end of the shaft 26 rotates within a reciprocable sleeve 28 which is interposed between the upper winding head 27 which is keyed to the shaft 26 and a thrust collar 29 which is fixed to the shaft 26. The upper end of the sleeve 28 is slidably mounted in a bearing 30 which is formed in the outer end of the intermediate supporting arm 20. The sleeve 28 has a rack 31 extending longitudinally thereof which meshes with a pinion 32 which may be manually controlled from a hand wheel 33 which is mounted on a shaft 39 and adapted to raise and lower the winding head 27. The rack 31 also constitutes a key for the sleeve 28 and prevents its turning in the bearing 30.

The winding head 27 is a relatively heavy metal disc having adjustable winding dies 63 mounted thereon which cooperate with suitable registering dies 56 which are carried by the lower winding head. The winding head 27 is relatively heavy and it rests by gravity upon the lower winding member and rotates therewith. The slidably mounted shaft 26 permits the upper winding head to rise as the thickness of the layers of strip material increases and separates the upper winding head from the lower winding head. The differential weight of the upper winding head is sufficient to press the superposed layers of material together and compact it as it is wound in order that annular laminated bodies thus formed will retain their shape after being removed from the machine. The hand wheel 33 permits the upper winding head to be elevated sufficiently to permit removal of the laminated bodies after a winding operation is completed.

The weight of the member 27 may be partially or entirely counterbalanced as desired by a weight 34 which is suspended adjacent the pedestal 3 and connected to the sleeve 28 by a cable 35 which extends over sheaves 36, 37 and 38, best shown in Figs. 1 and 2. The vertical shaft 15 which is driven from the gear 14 is journaled in a bearing 40 in the base 1 below the bevel gear 14 and in a bearing 41 which is formed in a cam support 42 which overlies the gear 14.

The cam support 42 is rigidly mounted on the base member 1 and is secured in place by a plurality of dowels 43. The casing 2 which partially encases the winding head is mounted on the cam support 42 and is held in place by a series of lugs 44.

The lower winding head comprises a rotatable spider 45 which is keyed to the upper end of the shaft 15 and a plurality of radially arranged winding arms 46, at the outer ends of which vertically arranged cam rods 47 are pivoted which actuate the winding arms as hereinafter set forth. The spider 45 is keyed to the upper end of the shaft 15 and it has a plurality of circumferentially arranged sleeves 46' formed in its peripheral portion which are adapted to slidably receive a plurality of cam rods 47 which are pivotally connected at their upper end to the winding arms 46. Each of the cam rods 47 has a suitable cam roller 48 mounted between bifurcated portions of its lower end and held in place by laterally extending pins 49. The cam rollers 48 are adapted to engage the cam race 50, which is formed on the cam support 42, to actuate the respective winding arms in accordance with the rotative position of the winding head. Each of the winding arms 46 is pivotally secured to the upper end of the shaft 15 by means of a pair of cooperating bearing plates 51 and 52 which pivotally receive enlarged portions on the inner ends of the winding arms. Each of the arms 46 pivots about its inner end in the plane of the shaft 15 in accordance with the position of the corresponding cam mechanism on the cam race 50. The bearing plates 51 and 52 and the spider 45 are secured to the upper portion of the shaft 15 by a suitable nut 53. A guide sleeve 54, which is secured to the spider 45, has a plurality of upwardly extending arms 55 which cooperate with the winding arms 46 to maintain the arms in outwardly extending radial formation.

Each of the arms 46 also has a winding die 56 adjustably mounted thereon, which is adapted to be moved to a plurality of positions along the corresponding arm in order that the machine may be adapted to wind annuli of various diameters. Each of the die members 56 has a V-shaped ridge 57 which increases in height toward the inner end of the arm and terminates at its other end in a suitable stop flange 58. The V-shaped ridge is adapted to be moved to various positions along the corresponding arm 46 and to be secured in position by the cooperation of transverse pins 59 with suitably formed notches 60 which are arranged at intervals on the arms 46. The cam support 42 also has a pair of supplemental cam members 61 and 62 which engage the end portions of the cam pins 49 to cause the cam rollers to positively follow the cam race 50.

Each of the adjustable winding dies 56 cooperates with a correspondingly formed die 63 which is mounted in the upper die head and these dies grip and spirally wind the strip 80 between them to form an annular body. Each of the die members 63 has a V-shaped groove 64 therein which is adapted to register with the V-shaped ridge 57 of the corresponding die members carried by the lower winding head. An abutment pin 66 extends downwardly from each of the die members 63 and serves to define the inner circumference of the annulus being built up by the machine.

The winding dies 63 are adjustably mounted in a series of radially extending slots 67 formed in the upper winding head 27 by means of a series of spaced adjustment holes 68 in which the securing screws 69 may be positioned to hold the die members in adjusted relation. Each of the die members 63 is adapted to be slidably received in the radially extending slots 67 which define the position of the die members 63 relative to the winding head. When the die members 56 and 63 are properly positioned relative to each other for winding an annular body, one of the die members 63 overlies and registers with one of the die members 56 in the upper winding head.

The V-shaped ribs 57 of the die members 56 form enlarged V-shaped corrugations 83 enlarging radially inwardly of the strip 80 as it is bent edgewise into arcuate form and press the strip against previously wound laminæ.

If it is desired that several strips be simultaneously wound into a single annulus by this machine, a plurality of guide plates 81 may be used and a corresponding depression 82 formed in the cam face 52 at the position of such additional guide plates 81 as may be desired. By arranging these plates circumferentially around the machine, two or more strips of strawboard may conveniently be wound simultaneously.

It will be seen that instead of using a single continuous strip for forming the laminated annular body series of strips may be successively fed into the machine.

It should also be noted in this connection that the ridged portion of the winding die members may be formed on either the upper or lower winding head, the object of this construction being to positively form a corrugation in the strip material which is substantially mechanically correct for the type of final corrugation appearing in the laminæ of the annulus. While a relatively large number of adjustments are provided in the machine, it may be necessary to provide die members of different dimensions for the winding of annular bodies over certain zones of the adjustable range of the machine.

The operation of my machine may best be explained by first describing the operation of the mechanical portions of the machine and then describing the cooperative action of these parts upon the strip of material being wound into annular form. Power is transmitted from the motor 5 or other suitable source of power through the differential pulleys 9 and 10 to the lower winding head and also to the upper winding head, which is synchronously operated therewith. The counterbalancing weight 34 is of such value that the head 27 may impose the desired weight upon the portion of the annular body being formed.

As the lower winding head is revolved, the cam rollers 49 traverse the track 52 and maintain the lower winding dies 56 in their uppermost position up to the depression 82 of the cam track, where the die members 56 are successively depressed to such position that they may pass beneath the guide plate 81 where the strip enters between the guide plates and delivers the strip of material directly to the winding dies 56. As the lower winding head continues to revolve, the inclined face of the depressed portion of the cam track again raises the winding dies into operative relation against the strip being wound, thereby simultaneously winding and pushing the incoming strip up against the previously wound laminæ.

A strip of material 80, such as strawboard, coarse-grained paper, or other suitable material from which it is desired to construct annular bodies, is introduced through the guide 81 to a position tangential of the winding dies 56, where the strip of material is delivered directly over the face of the die. The corrugation which is previously formed in the strip material causes the material to take substantially an arcuate form as the winding head advances. As the strip of material leaves the delivery guide 81, the winding die members 56 grip the strip, and these members are so arranged with respect to the corrugating mechanism that the ridge of the respective die members enters the corresponding valley of the corrugation in the strip of material and advances, by reason of the inclined face of the cam race, until the corrugation is enlarged radially inwardly and the material is pressed against the portion of the annular body that is previously wound in the machine.

The degree of pressure necessary to get the best results depends upon the speed of winding, the amount of binder used, and the character of fibrous strip being wound.

The strip may be wound with relatively sharp corrugations 83, such as indicated in Fig. 8, or the corrugations may be more rounding, as indicated at 84 in Fig. 8ª. It will be noted, however, that even when the corrugations do not have such sharp ridges, the corrugations are still puckered so that they are deeper around the inner side of the strip 80′ and taper off gradually to the outer side of the strip.

After the winding operation has progressed to such a degree that the annulus is of the required thickness, the strip of material is severed, the remaining portion is fed into the machine, and the annulus which has been consolidated into a composite body 85 by the action of the winding dies and the weighted head 27 of the machine, is removed by elevating the upper winding head 27 to such a position that the formed annulus 85 can be removed from the machine.

A suitable binder may be applied to the strip from which the annular form is wound, or such binder may be applied at any stage in the operation in order that the annular body when removed from the machine will be consolidated into a mass which may be conveniently handled for further pressing in a suitable press, or consolidated into a mass of such character that it may be immediately used in the condition in which it is removed from the machine for the construction of the faces of pulleys for power transmitting purposes and for other uses to which said materials may be applied.

Annular bodies of the form delivered from a machine of this character may be greatly compressed to a consolidated mass of any desired density.

Furthermore, it is to be understood that the particular forms of apparatus shown and described, and the particular procedure set forth, are presented for purposes of explanation and illustration, and that various modifications of said apparatus and procedure can be made without departing from my invention as defined in the appended claims.

What I claim is:

1. Apparatus for forming laminated bodies comprising strip guiding means, superposed annular winding members adapted to receive a corrugated strip from the guiding means and formed to engage the strip between them and increase the depth of the corrugations along the inner edge of said strip, and means for simultaneously rotating said winding members and concurrently pressing the strip against previously wound laminæ with the corrugations in nested relation.

2. Apparatus for forming laminated bodies comprising opposed coaxial rotary members one movable toward and from the other, said members having cooperating dies disposed around the axis of rotation, said dies being relatively movable and adapted to progressively engage a strip fed between them, said dies being formed to bend said strip and wind the same in superposed annular layers.

3. Apparatus for forming laminated bodies, comprising means for guiding a strip to defined relation with winding means, means for winding the strip in superposed annular layers comprising superposed rotary members each having regularly spaced circumferentially disposed gripping elements, the gripping elements of one of said members being movably mounted with respect to the corresponding elements of the other winding means, and means for shifting the movably mounted members at the point of entrance of the strip to permit the strip to be fed continuously between said members.

4. Apparatus for forming laminated bodies comprising superposed gripping elements, one yieldingly pressing against the other, means for guiding a strip to said gripping members, and means carried by said gripping members for pressing corrugations in said strip.

5. Apparatus for forming laminated bodies comprising a rotary head, a series of radially disposed arms pivoted at their inner ends thereto, dies carried by said arms, a cam track for supporting the ends of said arms, a rotatably mounted disk superposed over said arms and free to move vertically, dies carried by said disk and adapted to cooperate with the dies on the arms, said cam track having a depressed portion whereby said dies are separated at one point in their movement, and means for guiding a strip into the space between the separated dies.

6. Apparatus for forming laminated bodies comprising a pair of opposed rotary members having gripping dies arranged at regularly spaced intervals circumferentially thereof, the dies of one member alining with those of the other and opposed dies being complementary one to the other, one die of each pair being provided with a radially disposed groove and the other with a rib adapted to fit the groove, and one die of each pair being movably mounted, means for holding the dies in yielding relation throughout the major portion of their path of travel and separated throughout the remainder thereof, and means for guiding a strip between separated dies.

7. Apparatus for forming laminated bodies comprising a supporting member mounted to rotate about a vertical axis, a relatively heavy disk supported on said member and mounted for rotation about the same axis as the supporting member and movable vertically relative thereto, said disk and supporting member having cooperating dies adapted to compress a strip between them to form transverse corrugations of increasing depth toward the axis of rotation and to wind said strip in superposed annular layers around said axis of rotation.

8. Apparatus for forming laminated bodies comprising an upper member mounted to rotate about a vertical axis, a relatively heavy disk mounted on said member and mounted for rotation on the same axis, a lower supporting member, means for lifting said upper member, dies upon the under side of said upper member, cooperating dies upon the supporting member, said last mentioned dies being movably mounted, said dies being adapted to positively form corrugations in a strip engaged thereby, means for separating the dies at one point, and means for guiding a strip into the space between the dies at said point.

9. Apparatus for forming laminated bodies comprising opposed coaxial rotary members having cooperating dies arranged about the axis of rotation, said dies being formed to press corrugations in a strip fed between the same which increase in depth toward the axis whereby the strip may be bent by the said dies during rotation of said members into annular form, said dies being adjustable radially on said members.

In testimony whereof I affix my signature.

GEORGE T. TRUNDLE, Jr.